United States Patent [19]

Sakakibara et al.

[11] Patent Number: 5,686,773
[45] Date of Patent: Nov. 11, 1997

[54] ALTERNATOR WITH GENERALLY TRIANGULAR ENGINE-MOUNTING STAYS

[75] Inventors: Hiroshi Sakakibara, Chita-gun, Japan; Hirofumi Fujimoto, Edgware, England

[73] Assignee: Nippondenso Co., Ltd., Kariya, Japan

[21] Appl. No.: 471,361

[22] Filed: Jun. 6, 1995

[30] Foreign Application Priority Data

Jun. 20, 1994 [JP] Japan ................................ 6-137566
Feb. 17, 1995 [JP] Japan ................................ 7-028540

[51] Int. Cl.$^6$ ................................................ H02K 5/00
[52] U.S. Cl. ............................. 310/91; 310/89; 248/551
[58] Field of Search ................................ 310/91, 68 D; 248/637, 638, 645, 659, 670, 674, 677, 678

[56] References Cited

U.S. PATENT DOCUMENTS

| | | | |
|---|---|---|---|
| 4,201,930 | 5/1980 | Inagaki et al. | 310/51 |
| 4,537,381 | 8/1985 | Arai | 248/559 |
| 4,546,280 | 10/1985 | Pflüger | 310/68 D |
| 4,634,091 | 1/1987 | Butler | 248/637 |
| 4,900,224 | 2/1990 | Timperi et al. | 415/213.1 |
| 4,980,589 | 12/1990 | Ochi et al. | 310/68 D |
| 5,205,529 | 4/1993 | Killian | 248/636 |
| 5,462,465 | 10/1995 | Schmidt | 440/111 |

FOREIGN PATENT DOCUMENTS

| | | |
|---|---|---|
| 62-19086 | 5/1987 | Japan. |
| 63-49467 | 10/1988 | Japan. |
| 5-56615 | 3/1993 | Japan. |
| 6-38431 | 10/1994 | Japan. |
| 415421 | 8/1934 | United Kingdom. |
| 1364050 | 8/1974 | United Kingdom. |

*Primary Examiner*—Steven L. Stephan
*Assistant Examiner*—Elvin G. Enad
*Attorney, Agent, or Firm*—Cushman, Darby & Cushman IP Group of Pillsbury Madison & Sutro LLP

[57] ABSTRACT

The connection structure of alternator mount stays with a drive frame and a rear frame is strengthened so that increased vibration of the alternator's rotor and a stator is prevented and, accordingly, generation of magnetic noise is suppressed. The alternator is provided with generally triangular engine-mounting stays which are secured to an engine. A plurality of stay-reinforcement ribs are integrally formed with sides of the engine-mounting stays of the alternator and with the bottom of outer peripheries of the alternator, thereby increasing the rigidity of the stays. Consequently, vibrations from the engine are not amplified by the engine-mounting stays or transmitted to the drive frame or to the rear frame, thereby suppressing an increase in vibration of the rotor and the stator. Deformation of the drive frame and the rear frame due to the vibration transmitted from the engine is also prevented. As a result, an increase in distortion of the magnetic field is prevented and harsh magnetic noise is suppressed.

9 Claims, 8 Drawing Sheets

PROIR ART

5,686,773

ALTERNATOR WITH GENERALLY TRIANGULAR ENGINE-MOUNTING STAYS

CROSS REFERENCE TO RELATED APPLICATION

The present application is based on and claims priority from Japanese Patent Applications No. Hei 6-137566 and No. Hei 7-28540 respectively filed on Jun. 20, 1994 and Feb. 17, 1995, the contents of which are incorporated herein by reference.

BACKGROUND OF THE INVENTION

1. Field of the Invention

The present invention relates to a generator, such as an alternator or a direct current generator for generating, electric power driven by a driving source, particularly, the invention relates to an alternator used as a generator for charging a battery installed in an automotive vehicle.

2. Description of Related Art

Recently, consumer demands for a quiet vehicle have increased and, accordingly, requirements for reducing noise caused by automotive parts have been increasing. Reduction of magnetic noise is one of the important needs in alternators for vehicles. The magnetic noise of the alternator is generated when load current flows in the armature windings. When magnetic flux in the air gap of the alternator is changed by the armature reaction, a Lorentz force is generated in the rotor and the stator of the alternator to vibrate portions of the stator and frame.

In order to reduce the magnetic noise of the claw pole type alternator, the claw pole portion is designed in view of magnetic noise reduction concerns, the air gap between the rotor and the stator is increased so that any abrupt change in the magnetic flux between the rotor and the stator is prevented, thereby reducing the Lorentz force and consequently reducing the magnetic noise generated by the alternator. Such technology is already known to the public as disclosed, for example, in Japanese Patent Publication No. Sho 61-11066, Japanese Patent Publication No. Sho 63-49467, Japanese Patent Unexamined Publication No. Hei 5-56615.

A conventional structure of an alternator is shown in FIG. 7, and a conventional mounting structure is shown in FIG. 8. In these figures, an alternator 100 has a drive frame 101, a rear frame 103, a stator 105 which is sandwiched between the drive frame 101 and the rear frame 103 and is inserted into their open ends 102 and 104 and a plurality of through bolts 106 which fasten the drive frame 101 and the rear frame 103 together.

The drive frame 101 has a mount stay 107 and adjustbar-side stay 108 integrally formed therewith, and the rear frame 103 has a mount stay 109 integrally formed therewith to face the stay 107.

Engine-side brackets 111 and 112 (shown in FIG. 8) are provided on an engine (not shown) to fix the mount stays 107 and 109 with a bolt 110, and also an engine-side adjust-bar 114 is provided on the engine to fix the adjustbar-side stay 108 to the engine by a bolt 113.

Width 'A' in FIG. 7 is a clearance between the mount stays 107 and 109 to provide tolerance of the frame sizes, Width 'B' is a clearance between the open end 102 of the drive frame 101 and the open end 104 of the rear frame 103, and width 'C' is the total length of the alternator 100. L1 is the total width of the stays of the alternator 100 and is approximately equal to the engine side mounting space L2 (shown in FIG. 8). Reference numerals 116 and 117 indicate stay reinforcement ribs, reference numeral 119 indicates a V-belt pulley, reference numerals 120 and 121 indicate bearings and reference numeral 122 indicates brushes.

Even though the magnetic noise level of such a conventional alternator 100 itself is fairly good, the total width L2 from the mount surface of the mount stay 107 to the mount surface of the mount stay 109 is less than half the total length 'C' of the alternator.

Therefore, when the alternator 100 is mounted on an engine and vibration is transmitted from a vibration source such as the engine to the mount stays 107 and 109, the vibration from the vibration source is amplified by the mount stays 107 and 109 because of insufficient rigidity thereof and is transmitted to the drive frame 101 and the rear frame 103, thereby increasing vibration of the rotor 118 and the stator 105, etc.

Thus, strains are generated on the drive frame 101 and the rear frame 103 and deform the interior parts such as the stator 105 and the rotor 118, thereby resulting in distortion of the magnetic field. As the vibration of the stator 105 and the rotor 118 or other components increase, the magnetic field distortion increases. Thus, the magnetic noise increases at a greater rate than that generated in the alternator 100 by itself, and the noise becomes harsh to the driver's ears at a relatively low engine speed.

SUMMARY OF THE INVENTION

A primary objective of the present invention is to provide a generator which can prevent deformation of stays and frames caused by vibration transmitted from a vibration source so that deformation of the generator's stator and the rotor may be prevented.

Another objective of the present invention is to provide a generator in which the stays and the frames are reinforced to prevent vibration of the rotor and the stator and to prevent a fluctuation of the rotational speed of the rotor.

A further objective of the invention is to provide a generator which prevents the generation of harsh noise during low engine-speed operation.

For the above objectives, an alternator according to the present invention includes stays formed along a circumference of a cylindrical portion of the alternator, and reinforcement members connected between the stays and the cylindrical portion which extend from sides of the stays to the outside of side wall portions of the alternator.

The alternator according to the present invention preferably includes connecting members which are connected between the stays and the cylindrical portion and has diagonal members extending from sides of the stays of the side wall portions.

The above-mentioned reinforcement members may be formed integrally with a circumference of the cylindrical portion so that portions of approximately half an axial length of the stays are connected with axial end portions of the alternator. The frame may include a pair of first and second frames sandwiching the stator between open ends of the cylindrical portions. The stays may include first and second stay members disposed at circumferences of the cylindrical portions of the first and said second frames.

The reinforcement members may be formed integrally with circumferences of the cylindrical portions of the first and second frames so that approximately half an axial length of the first and second stay members, respectively, are connected with axial end portions of the alternator.

Further, an inclination angle of each peripheral line of each of the reinforcement members to an imaginary line which connects an approximately a point between the first and second stays and a corresponding one of the axial end portions of the alternator is between −20° to +10°.

Since the reinforcement members or the connecting members connecting the frame with the stays are formed to extend from the stays to the wall portions of the frame, vibrations transmitted from a vibrating body (such as an engine) are dispersed to all portions of the frame, thereby preventing the vibration energy from being concentrated at a specific portion.

Thus, since the strain caused by vibration transmitted from a vibrating body hardly affects the stays, the cylindrical portions and the side-wall portions of the frame, deformation of the cylindrical portions and the side-wall portions of the frame is prevented.

As a result, deformation of the stator and the rotor housed in the cylindrical portions of the frame is suppressed and the distortion of the magnetic field will not be amplified.

BRIEF DESCRIPTION OF THE DRAWINGS

Other objects, features, and characteristics of the present invention as well as the functions of related parts of the present invention will become clear from a study of the following detailed description, the appended claims and the drawings. In the drawings:

DETAILED DESCRIPTION OF THE PREFERRED EMBODIMENT

Figure 1:
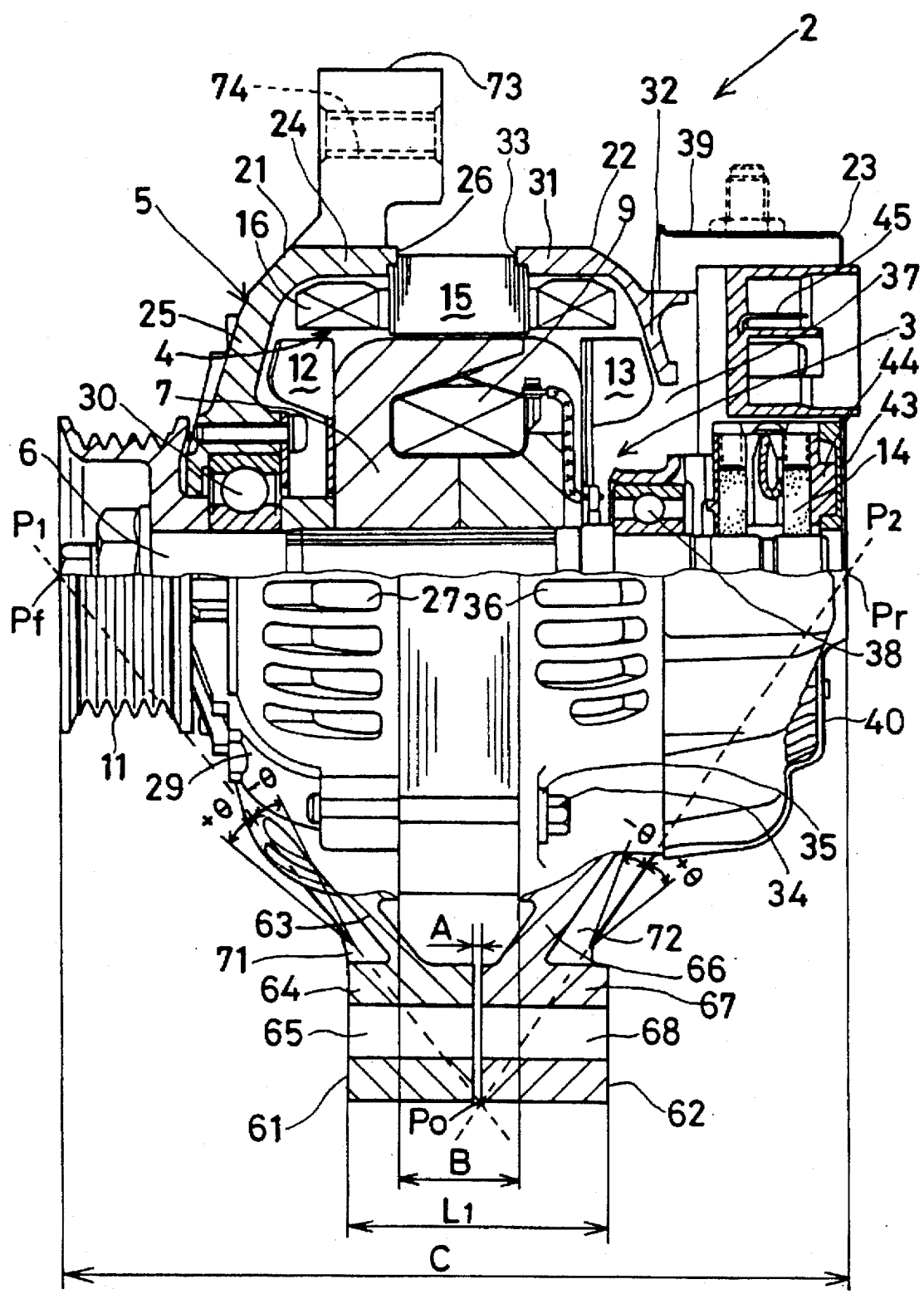
FIG. 1 is a partial cross-sectional side view illustrating an alternator according to an embodiment of the present invention.
Figure 2:
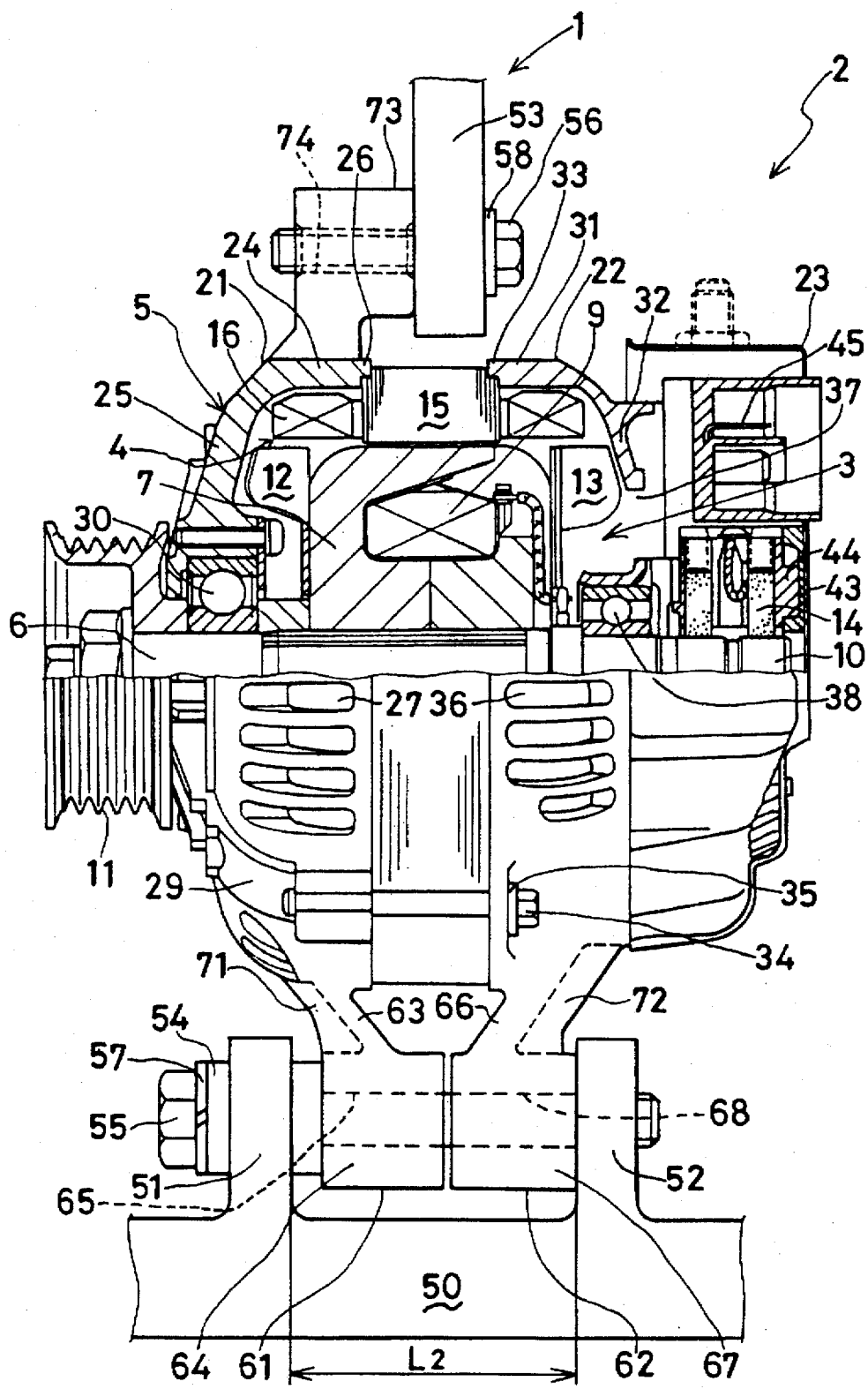
FIG. 2 is a partial cross-sectional side view illustrating the alternator used in the embodiment of the present invention on a mounting structure.

An alternator 2 according to an embodiment of the present invention is applied to an alternating current generator for a vehicle such as an automobile. FIG. 1 is a side view illustrating the alternator structure itself and FIG. 2 is a side view illustrating the alternator and its mounting structure.

The alternator mounting structure 1 is a Structure for mounting the alternator 2 on a vibrating body such as a body of an automobile or on an engine disposed in an engine compartment (not shown). The alternator 2 is composed of a rotor 3, a stator 4 and a housing 5 and other members and generates electric power in response to a driving force.

The rotor 3 functions as a magnetic field generator, and rotates together with a shaft 6. The rotor 3 is composed of a claw-pole type pole core (or field cores) 7, field windings (or a field coil) 9, a pair of slip rings 10 and other components. A V-ribbed pulley 11 is secured at an end (to the left in FIG. 7) of the shaft 6 to transmit an engine driving force to the shaft 6. The pole core 7 has a pair of claw pole members each of which has a plurality of claw poles. The V-ribbed pulley 11 is connected via a belt to a pulley (not shown) secured to an output shaft of the engine. Alternatively, the shaft 6 may be directly connected to the output shaft of the engine. The shaft 6 may be connected via a transmission assembly such as a gear reduction mechanism having one or more reduction stages or a V-belt-type continuous-speed transmission mechanism.

The pole core 7 has field windings 9 at a central portion thereof and provides N poles at all the claw poles of one of the claw pole members and S poles at all the claw poles of the other claw pole member when excitation current is supplied to the field windings 9. The end surfaces of the pair of claw pole members have cooling fans 12 and 13 respectively, which are integrally formed therewith to take cooling air into the housing 5. The pair of slip rings 10 are carried by the other end of the shaft 6, on which brushes 14 slip.

The stator 4 is composed of an armature core 15 disposed around the pole core 7 and three-phase armature windings 16 wound around the armature core 15. The armature core 15 is a laminated core having a plurality of thin magnetic plates (or stator core), and is press-fitted into an inner periphery of the housing 5. The armature core 15 forms magnetic paths for magnetic flux coming out of the pair of claw pole members of the pole core 7 to cross the three-phase armature windings (or stator coil) 16 sufficiently. A plurality of slots (not shown) are formed on the inner periphery of the armature core 15 to accommodate the three-phase windings 16 which are connected into a Y-connection or a Δ-connection to induce three-phase alternating voltage as the rotor 3 rotates.

Figure 3:
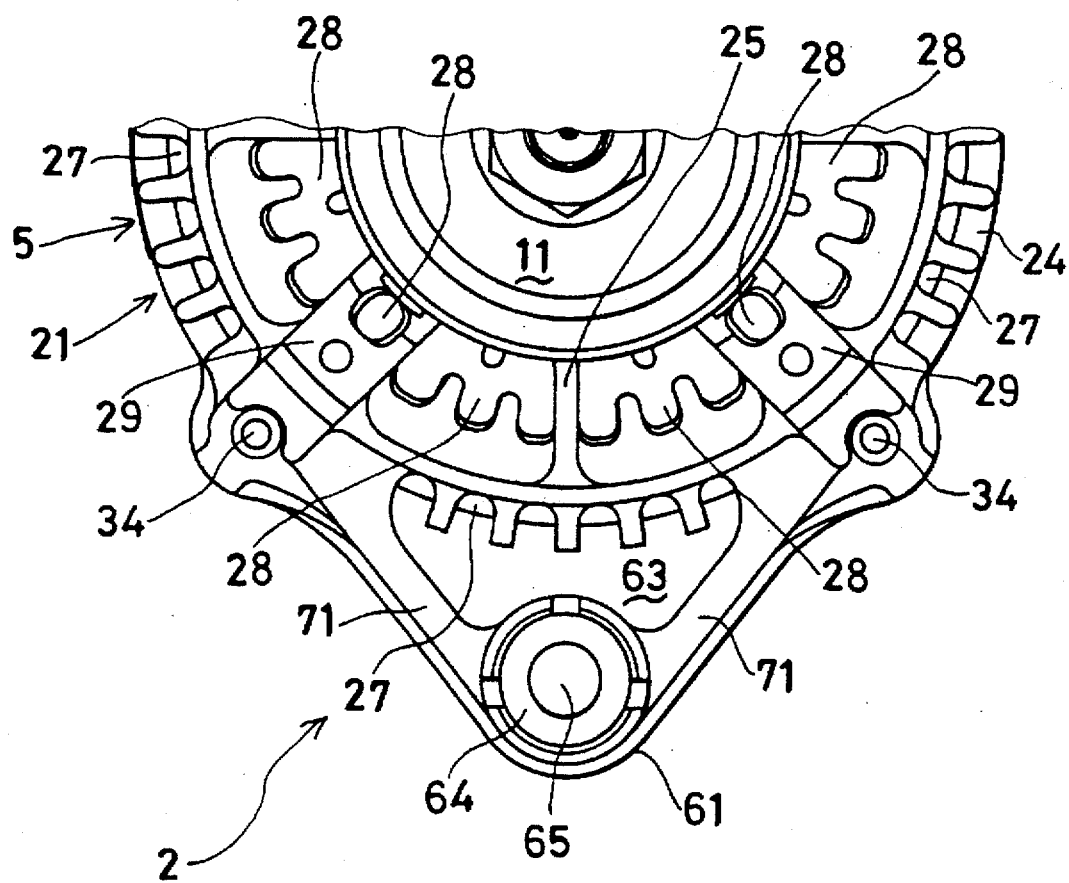
FIG. 3 is a front view illustrating a front-end portion of the alternator shown in FIG. 1.
Figure 4:
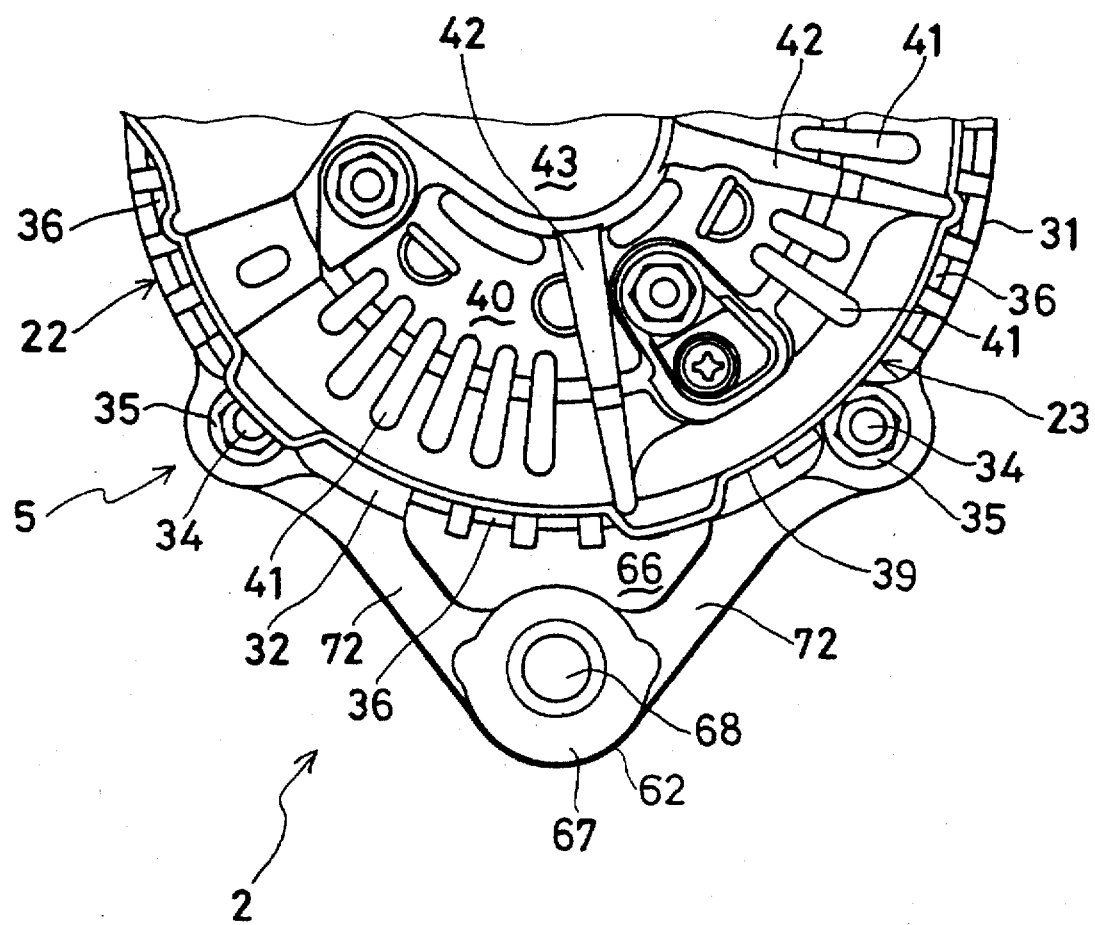
FIG. 4 is a rear view illustrating the rear-end portion of the alternator shown in FIG. 1.

A detailed description of the housing is described next with reference to FIG. 1 through FIG. 4. Here, FIG. 3 is a front end view illustrating the alternator 2 and FIG. 4 is a rear end view of the alternator 2. The housing 5 is composed of a drive frame (or front frame) 21, a rear frame 22 and a rear cover 23. The drive frame 21 rotatably supports one end of the rotor 3 and the shaft 6 rotatably and is a member to be fixed to an engine.

The drive frame 21 is die-cast from aluminum to form a cylindrical portion 24 and a side-wall 25. The cylindrical portion 24 is a cylindrical portion of the present invention and holds an end (front-end portion) of the armature core 15 of the stator 4 at the open end (inserting portion) facing the rear frame 22.

The cylindrical portion 24 and the side-wall 25 respectively have a plurality of cooling air windows 27 and 28 (shown in FIG. 3) through which cooling air is taken in by the cooling fans 12 and 13. A plurality of frame-reinforcement ribs 29 are formed on the cylindrical portion 24 and the side wall portion 25 as shown in FIG. 3.

The frame-reinforcement ribs 29 are members for reinforcing the drive frame 21 and extend from the central portion of the side-wall portion 25 toward an open end 26 of the cylindrical portion 24. A bearing 30 which rotatably carries the shaft 6 is disposed inside the side-wall portion 25.

The rear frame 22 rotatably supports the other ends of the rotor 3 and the shaft 6. The rear frame 22 is formed from die-cast aluminum and includes a cylindrical portion 31 and a side-wall portion 32 and others.

The cylindrical portion 31 holds and fixes the other end (rear end) of the armature core 15 of the stator 4 at an open end (or inserting portion) 33 facing the open end 26 of the cylindrical portion 24. The open end 33 of the cylindrical portion 31 and the open end 26 of the cylindrical portion 24 face each other at a space (or clearance) 'B' in parallel with the axis of the shaft 6. The cylindrical portion 24 of the drive frame 21 and the cylindrical portion 31 of the rear frame 22 are fastened and fixed together by a plurality (four in this embodiment) of fastening members such as through bolts 34, washers 35 and the like as shown in FIGS. 3 and 4.

The cylindrical portion 31 and the side-wall portion 32 have a plurality of cooling-air windows 36 and 37 through which cooling air is taken in by the cooling fans 12 and 13 as shown in FIG. 4. The cylindrical portion 31 and the side-wall portion 32 shown in FIG. 4 have a plurality of frame-reinforcement ribs (not shown) formed thereon. The frame-reinforcement ribs are members to reinforce the frame 22 which extend from the central portion of the side-wall portion 32 toward the open end 33 of the cylindrical portion 31. A bearing 38 which rotatably carries the shaft 6 is disposed inside the side wall portion 32.

The rear cover 23 has a cylindrical portion 39 and a side-wall portion 40 and is press-formed from a metal plate such as an aluminum plate into a unit. The side-wall plate 40 has a plurality of cooling air windows 41 (shown in FIG. 4) through which cooling air is taken in during rotation of the cooling fans 12 and 13. 4. The side-wall portion 40 has a plurality of frame reinforcement ribs 42 formed thereon as shown in FIG. 4. The frame-reinforcement ribs 42 extend from a central portion of the rear cover 23 toward the open end of the rear cover 23. A packing material is disposed inside the side-wall portion 40 to prevent foreign particles from entering the alternator interior near the shaft 6, the slip rings 10 and the brushes 14.

The two brushes 14 which slip on the two slip rings 10 and a brush holder 44 for the brushes 14 are disposed and secured between the rear frame 22 and the rear cover 23 (see FIG. 2). A rectifying unit (not shown) and a IC regulator 45 are also fixed by bolts or the like between the rear frame 22 and the rear cover 23. The rectifying unit has a plurality of diodes which convert alternating current into direct current. The IC regulator 45 toggles a switching element such as a transistor (not shown) inserted between the field coil 9 and chassis ground (not shown) to control the excitation current flowing through the field windings 9, thereby maintaining the output voltage of the alternator 2 at a constant voltage.

Next, the mounting structure 1 of the alternator 2 is described in detail with reference to FIG. 1 and FIG. 2. The engine is a driving source of the alternator as well as a mounting structure or mounting body for the alternator. The alternator-mounting structure is composed of engine-side brackets 51 and 52 (shown in FIG. 2) which support bottom portions of the alternator 2, an engine-side adjust-bar 53 which supports an upper portion of the alternator 2 and fastening members such as bolts (not shown) which fasten those members to the engine body.

The engine side bracket 51 supports a mount stay 61 of the alternator 2. The engine-side bracket 51 extends upward along an outer periphery of the engine from a bracket body 50 which is secured to the engine body and which has a through hole (not shown) at its end portion. A cylindrical slide-bushing 54 is slidably inserted in alignment with the center axis of the through hole inside the engine-side bracket 51. The slide bushing 54 is formed from sintered metal and has a through hole (not shown) in which a bracket-side bolt 55 is inserted.

The engine-side bracket 52 extends upward from the bracket body 50 along an outer periphery of the engine body, and face the engine-side bracket 51 at stay mounting length (or space or clearance) L2 (cf. FIG. 2) in parallel with the axis of the shaft 6. The engine-side bracket 52 has screw threads (not shown) for the bracket bolt 55.

The engine-side adjust-bar 53 extends downward along an outer periphery of the engine body and has a long arc-shaped hole (not shown) along which the alternator housing turns relative to the bracket-side bolt 55 as a pivot so that the belt is adjusted to transmit an engine driving force to the alternator 2. The bracket bolt 55 includes a fastening member with an annular washer 57. The adjust-bar-side bolt 56 also includes a fastening member with an annular washer 58.

A mount stay 61 is integrally formed and faces the mounting-surface of the engine-side bracket 51 At an outer periphery of the bottom of the cylindrical portion 24 of the drive frame 21 of the alternator 2. In the same manner as above, a mount stay 62 is integrally formed at an outer periphery of the bottom of the cylindrical portion 31 of the rear frame, and faces the mounting-surface of the engine-side bracket 52.

The mount stay 61 is composed of an approximately isosceles (viewing from the front end, see FIG. 3) leg members 63, i.e., a leg member having sides of substantially equal length, extending from an outer periphery of the drive frame 21 radially downward and outward (downward in FIG. 2) and a cylindrical fixture (bolt receiving portion) 64.

The isosceles leg member 63 has legs extending diagonally from an inner portion of the fixture 64 to the side wall portion 25 of the cylindrical portion 24. The fixture 64 is thicker than the leg member 63 in the axial direction, and is located at an outer circumference of the stator 4 and the open end 26 of the cylindrical portion 24. The fixture 64 has a circular bolt-hole 65 for the bracket-side bolt 55.

The mount stay 62 faces the fixture 64 of the mount stay 61 at a clearance (or space) 'A' (cf. FIG. 1) which is a tolerance gap for variations in the frame-size. The mount stay 62 is composed of an approximately isosceles (viewed from the rear end) leg member 66 extending from an outer periphery of the rear frame 22 in the same direction as the mount stay 61 and has a cylindrical fixture (bolt receiving portion) 67 at the bottom of the leg member 66.

The isosceles leg member 66 has legs extending diagonally from an inner portion of the fixture 67 to the side wall portion 32 of the cylindrical portion 31 as shown in FIG. 4. The fixture 67 is thicker than the leg member 66 in the axial direction, and is located at an outer circumference of the stator 4 and the open end 33 of the cylindrical portion 31. The fixture 67 has a circular bolt-hole 68 for the bracket-side bolt 55.

The total width L1 of the stays in the direction parallel to the axis of the shaft 6 is measured from the mounting surface of the fixture 64 of the mount stay 61 to the mounting surface of the fixture 67 of the mount stay 62 in this embodiment, and is approximately the same length as the stay mounting width L2. The total length L1 of the stay is less than half the total length 'C' of the alternator 2 (cf. FIG. 1). The total length 'C' of the alternator 2 is a length measured from the front-end surface Pf of the V-ribbed pulley 11 to the rear-end surface Pr of the side wall 40 of the rear cover 23. The mount stays 61 and 62 are formed integrally with the cylindrical portions 24 and 31 in this embodiment, however they may be connected by a fastening member such as a bolt or by soldering or the like.

Stay reinforcement ribs 71 (or connecting members) having a diagonal outer line P1 (a broken line in FIG. 1)

connecting a center position P0 (a position on a line extending downward from the center of the gravity of the alternator 2) located at an approximately the mid point of the total length L1 of the stays and an axially front-end surface Pf of the alternator 2 are located at the front side of the leg member 63 of the mount stay 61. In other words, the stay reinforcement ribs 71 are members to reinforce the mount stay 61 as well as members to connect the mount stay 61 with the drive frame 21.

The stay reinforcement ribs 71 are diagonal members extending from the cylindrical portion of the fixture 64 to the bottom of outer periphery of the side-wall portion 25 and are formed into a widely opening sector toward the front-end portion Pf of the alternator 2 to integrally connect to the bottom of the cylindrical portion 24 of the drive frame 21, the bottom of an outer periphery of the side-wall portion 25 and a plurality of the frame-reinforcement ribs 29 as shown in FIG. 3. The stay-reinforcement ribs 71 are formed at a side portion (generally V-shaped outer portion of the front surface) of the leg 63 as shown in FIGS. 1 and 3.

Stay reinforcement ribs 72 (or connecting members) having a diagonal outer line P2 connecting the position P0 located at approximately the middle of the stays 61 and 62 with the axially rear-end surface Pr of the alternator 2 are located at the rear side of the leg 66 of the mount stay 62. In other words, the stay reinforcement ribs 72 are members to reinforce the mount stay 62 as well as members to connect the mount stay 62 with the drive frame 22.

The ribs 72 have diagonal members extending from the cylindrical portion of the fixture 67 to the bottom of the outer periphery of the side-wall portion 32 and are formed into a widely opening sector toward the rear-end portion Pr of the alternator 2 to integrally connect to the frame reinforcement ribs of the rear frame 22 and the side-wall portion 32 of the rear frame 22. The stay-reinforcement ribs 72 are formed at side portions (generally V-shaped outer portion of the rear surface) of the leg 66 as shown in FIGS. 1 and 4. Thus, the stay-reinforcement ribs 71 and 72, the drive frame 21, the armature core 15 and the rear frame 22 form a triangle in the axial cross-section which includes the shaft 6 as indicated by the diagonal outer line $P_1$ and $P_2$ in FIG. 1.

The front-end surface Pf of the V-ribbed pulley 11 and the rear-end surface Pr of the rear-wall portion 40 of the rear cover 23 are respectively disposed in the axial direction of the alternator 2 and on the lines extending from the center point Po in this embodiment. However, they may be respectively disposed on the front-end surface of the drive frame 21 and on the rear-end surface of the rear frame 22, or on the front-end surface and on the rear-end surface of the shaft 6.

The stay reinforcement ribs 71 and 72 have sufficient thickness (e.g. they are about twice as thick as the leg members 63 and 66) to assure a certain amount of rigidity and, preferably, are selected from a material such as aluminum which is inexpensive and lightweight in view of the total weight of the alternator 2. The stay-reinforcement ribs 71 and 72 are formed as parts of the mount stays 61 and 62 in this embodiment, however they may be formed on the entire sides of leg members 63 and 66.

An adjust-bar-side stay 73 is formed integrally with the drive frame 21, however, it may be fastened to the drive frame 21 by a fastening member such as a bolt, or soldered to the top of the cylindrical portion 24 of the drive frame 21 of the alternator 2 to face the engine-side adjust-bar 53. The adjust-bar-side stay 73 extends from an outer periphery of the drive shaft 21 radially outward (upward in FIG. 1). The adjust-bar-side stay 73 has a threaded hole 74 for the adjust-bar-side bolt 56.

Mounting of the alternator 2 is next described with reference to FIG. 1 and FIG. 2. When the alternator 2 is mounted on an engine, the fixture 64 of the mount stay 61 and the fixture 67 of the mount stay 62 are first inserted between the slide bushing 54 and the engine-side bracket 52. Then, the slide bushing 54, the fixtures 64 and 67, and the engine-side bracket 52 are fastened together by the bracket-side bolt 55 via the washer 57. Thus, the fixture 67 of the mount stay 62 of the alternator 2 is fixed to the engine-side bracket 52 without space (or clearance).

Subsequently, a belt is put on a pulley (not shown) of the engine and also on the V-ribbed pulley 11, and the adjust-bar-side stay 73 of the alternator 2 is placed at a position of the long hole of the engine-side adjust-bar 53 to apply an appropriate tension to the belt. Then, the engine-side adjust-bar 53 and the adjust-bar-side stay 73 are fastened by the adjust-bar-side bolt 56 which is inserted in the long hole via the washer 58 so that the adjust-bar-side stay 73 is fixed to the engine-side adjust-bar 53.

In summary, the alternator 2 is secured to the engine-side bracket 52 by the bracket-side bolt 55 and is secured to the engine-side adjust-bar 53 by the adjust-bar-side bolt 56, thereby positioning the alternator 2 in the axial direction of the shaft and also in the rotating direction of the shaft 6. As a result, the alternator may be mounted without increasing mounting work.

The operation of the alternator according to this embodiment is described briefly next with reference to FIG. 1 and FIG. 2.

When the engine operates, the driving force of the engine is transmitted to the V-ribbed pulley 11, which drives the rotor 3. The field windings 9 are energized by a battery and excite a pair of the claw pole members of the pole core 7, one of which becomes an N-pole and the other of which becomes an S pole.

As a result, the armature core 15 of the stator 4 receives a rotating magnetic field as the rotor 3 rotates and generates alternating current in the three-phase armature windings 16. The three-phase alternating current is converted by the rectifying unit into direct current, thereby charging the battery and supply power to various electric loads in the vehicle.

When the engine operates, the vibration of the engine and vehicle body is transmitted through the engine-side brackets 51 and 52 to the mount stays 61 and 62. However, generally triangular stay-reinforcement ribs 71 and 72 are integrally formed on the bottom of the outer peripheries of the cylindrical portions 24 and 31 and on the bottom of the outer peripheries of the side-wall portions 25 and 32 to enclose the entire periphery of the alternator 2.

Therefore, the rigidity (strength) of the leg members 63 and 66 of the mount stays 61 and 62 is significantly increased relative to that of the conventional alternator. Thus, even if vibrations are transmitted from a vibrating source such as the engine through the engine-side brackets 51 and 52 to the mount stays 61 and 62, they are dispersed to all portions of the drive frame 21 and the rear frame 22 without concentration on the leg members 63 and 66 of the mount stays 61 and 62. As a result, the strain caused by the vibration of the mount stays 61 and 62 is decreased so that the deformation of the drive frame 21 and the rear frame 22 may be prevented.

In the conventional alternator 100, when an engine rotates and belt tension is applied to the V-ribbed pulley 119, the stay-reinforcement ribs 116 are weak because of their shape. As a result the strain is excessively concentrated on the stay-reinforcement ribs 116, the mount stay 107 is deformed and the rotor 118 is displaced, resulting in magnetic noise and decrease of the bearing life.

On the contrary, this embodiment has the frame-reinforcement ribs 29 which secure the front bearing 30 on the inner periphery of the side-wall portion of the drive frame 21 and the stay-reinforcement ribs 71 which connect integrally the bottom of the outer periphery of the cylindrical portion 24 of the drive frame 21 and the bottom of the outer periphery of the side-wall portion 25. As a result, even if belt tension is applied on the V-ribbed pulley 11, the stress is not concentrated on the stay-reinforcement ribs 71 and is instead dispersed to the frame-reinforcement ribs 29 at a plurality of places and to all portions of the drive frame 21 so that deformation of the drive frame 21 and the leg members 63 of the mount stay 61 is prevented.

In the rear frame 103 of the conventional alternator 100, when the stay-reinforcement ribs 116 of the drive frame 101 deform, the stay-reinforcement ribs 117 also deform since their rigidity is not sufficient and fluctuation of rotation of the rotor 118 increases, resulting in decrease of the bearing life and in abnormal wear of the brushes.

In the alternator according to the embodiment, however, the frame-reinforcement ribs of the rear frame 22 and the stay-reinforcement ribs 72 are formed into a widely opening sector toward the front-end portion Pr of the alternator 2 to integrally connect to the frame reinforcement ribs of the rear frame 22 and the side-wall portion 32 of the rear frame 22. As a result, even if the stay-reinforcement ribs 72 deform, the stress applied to the stay-reinforcement ribs 72 is dispersed to all portions of the rear frame 22 and the concentration of the stress on the stay-reinforcement ribs 72 is prevented. Accordingly, the stress is received by a plurality of the frame-reinforcement ribs and all portions of the rear frames 22 so that the deformation of the rear frame 22 and the leg members 66 of the mount stay 62 is prevented.

As stated above, since the alternator according to this embodiment prevents deformation of the housing such as the drive gear 21 and the rear frame 22, deformation of the stator 4 which is secured between the open end 26 of the drive frame 22 and the open end 33 of the rear frame 22 and fluctuation of rotation of the shaft 6 and the rotor 3 which are rotatably supported inside the side-wall portion 25 and the side wall portion 32 is prevented so that the long life of the alternator is ensured.

Since the deformation of the stator 4 and the rotor 3 and the fluctuation of the rotation of the rotor 3 are prevented, high circularity of the inner periphery of the armature core is ensured and the air gap between the outer periphery of the pole core 7 of the rotor 3 and the inner periphery of armature core 15 of the stator 4 does not change, so that the distortion of the magnetic field is prevented and harsh magnetic noise is suppressed.

Further, since the rigidity of the stay-reinforcement ribs 71 and 72 is increased, the strength of the mount stays 61 and 62 is enhanced. Accordingly, since vibrations from a vibrating source such as the engine are not amplified by the leg members 63 and 66 of the mount stays 61 and 62, they are not transmitted to the drive frame 21 and the rear frame 22. As a result, vibrations which are transmitted from a vibrating body such as the engine through the mount stays 61 and 62, the drive frame 21 and the rear frame 22 to the rotor 3, stator 4 and the shaft 6 are reduced, thereby reducing the distortion of the magnetic field.

When vibrations are transmitted from the engine to the mount stay 61, or when belt tension is applied to the V-ribbed pulley 11, the stress does not concentrate on the stay-reinforcement ribs 71, and therefore the mount stay 61 will reliably support the alternator 2. Accordingly, since the mount stay 61 is not deformed, the shaft 6 or the rotor 3 is not distorted, thereby preventing an increase in the magnetic noise and a decrease in the bearing life.

Even if the mount stay 61 is deformed, the stay-reinforcement ribs 71 keep the mount stay 62 undeformed, so that the fluctuation of rotation of the shaft 7 and the rotor 3 is prevented. As a result, life of the rear bearing is not shortened and abnormal wear of the brushes 14 is prevented.

It is also possible to reduce the harsh noise generated during a relatively low engine speed range by forming a pair of the claw pole members into an optimal shape and by increasing the air gap so that the magnetic noise of the alternator before mounting is reduced. Further, since only addition of the reinforcement ribs 71 and 72 of the embodiment to the conventional alternator 100 (cf. FIG. 7) gives the above effect, time for mounting the alternator 2 on the engine does not increase, thereby preventing a cost increase of the mounting structure 1 and the alternator 2.

Figure 5:
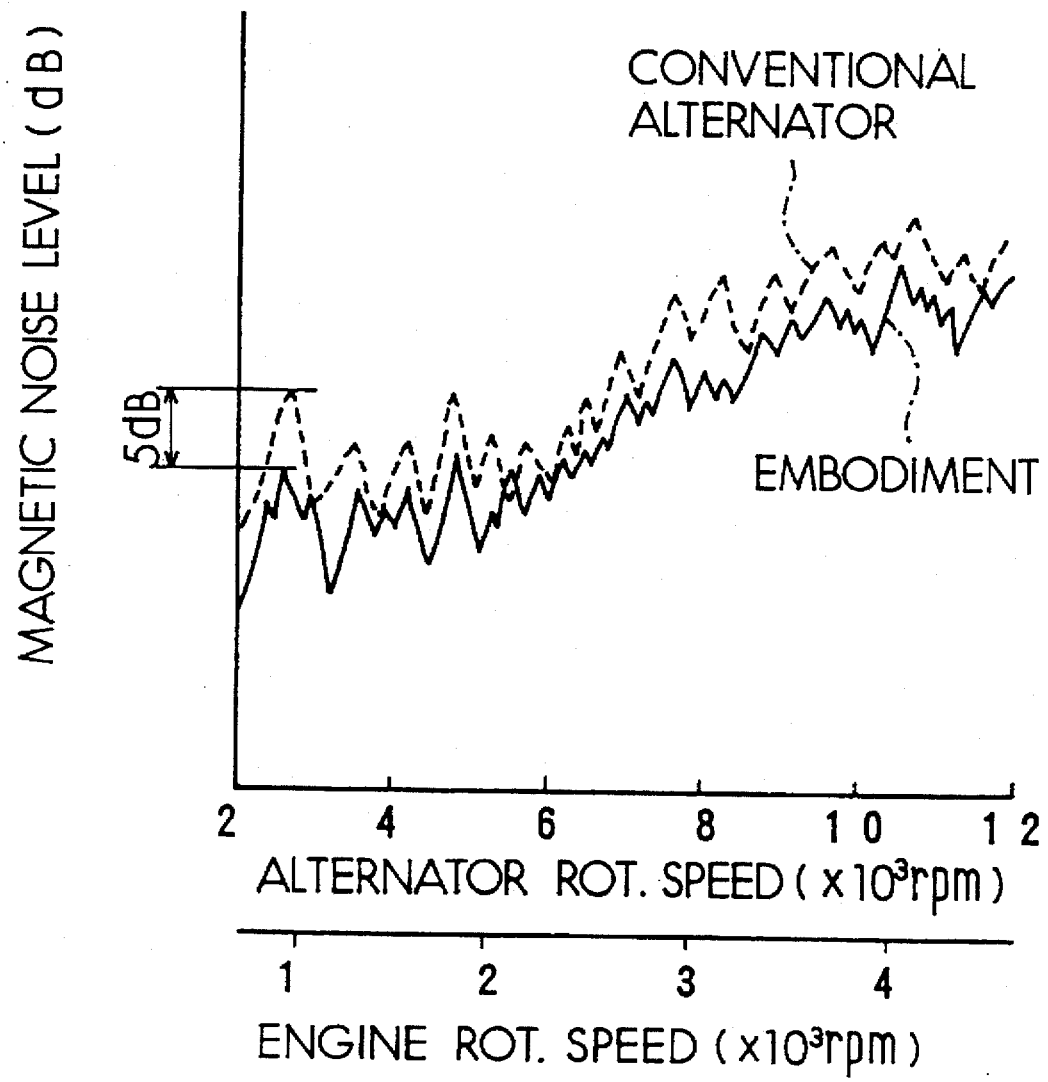
FIG. 5 is a graph showing the relationship between the magnetic noise level, engine speed and the rotational speed of the alternator according to the embodiment of the present invention and of a conventional alternator.
Figure 7:
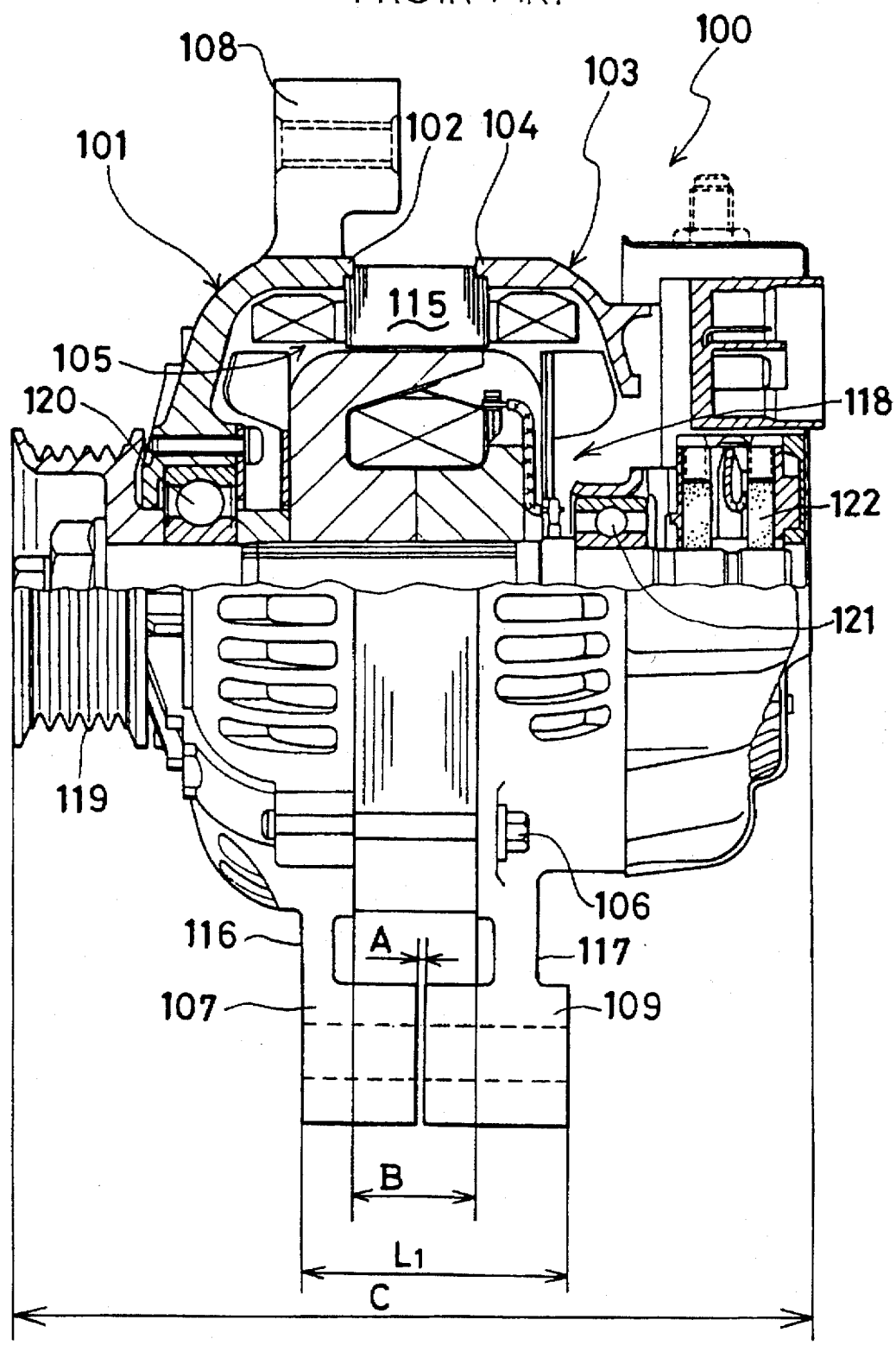
FIG. 7 is a partial cross-sectional view illustrating a conventional alternator.
Figure 8:
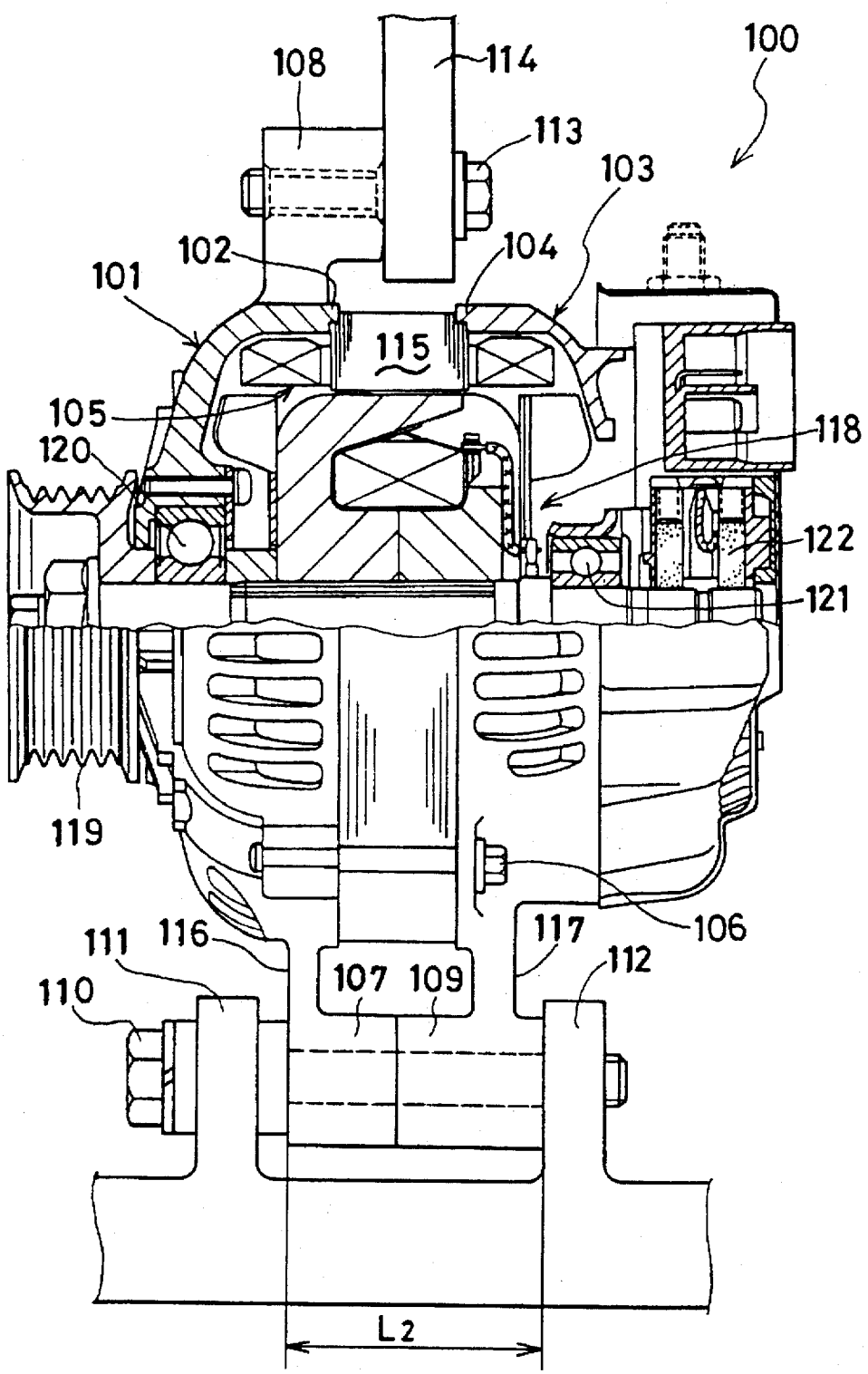
FIG. 8 is a partial cross-sectional view illustrating the conventional alternator mounted on a mounting structure.

FIG. 5 is a graph showing differences in the magnetic noise level generated by the alternator 2 (cf. FIG. 1) according to this embodiment and the conventional alternator 100 shown in FIG. 7. It is noted from FIG. 5 that there is 5 dB difference in a low-engine-speed range (2000 rpm throgh 4000 rpm) where the harsh magnetic noise is the most significant.

The outer lines P1 and P2 of the stay-reinforcement ribs 71 and 72 respectively extend from the position P0 located midway along the total width L1 of the stays to the front surfaces Pf and Pr, and they are nearly symmetrical. However, such an angle of the embodiment (as shown in FIG. 1) may not be feasible because of various conditions (such as the die structure for the aluminum die-casting process and the cooling structure of the die).

Figure 6:
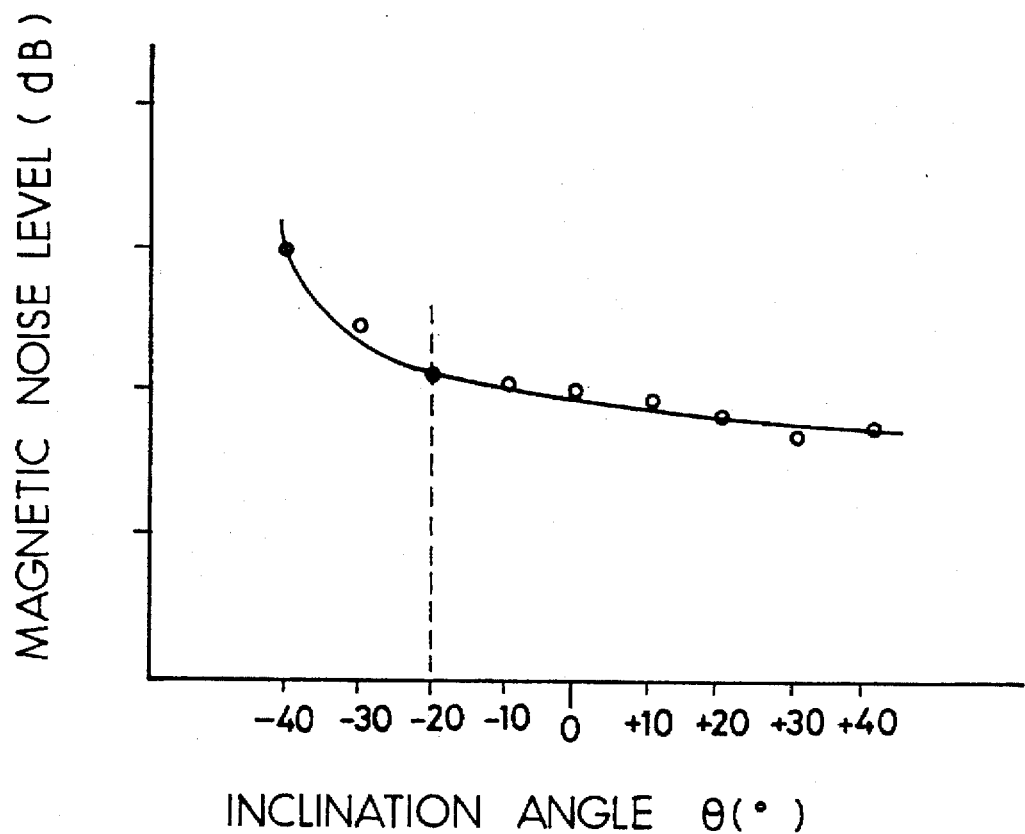
FIG. 6 is a graph showing the relationship between the magnetic noise level and an inclination angle of the reinforcement ribs of the mount stay.

Therefore, in case an inclination angle (deviation from the outer lines) with respect to the outer lines P1 and P2 of the stay-reinforcement ribs 71 and 72 is offset by $-\theta$ or $+\theta$ relative to one of the outer lines P1 and P2, the reduction in the magnetic noise is significant when $\theta$ is greater ( more to the right in FIG. 6) than $-20°$, but the magnetic noise become harsh when $\theta$ is less than $-20°$ as shown in FIG. 6. Therefore, the inclination angle of the outer lines P1 and P2 may be changed within the range $-20°<\theta<+10°$ based on the embodiment according to the above-mentioned conditions.

The alternator 2 having the stay-reinforcement ribs 71 and 72 whose inclination angle $\theta$ falls within the range $0>\theta<-20°$ (with respect to the outer lines P1 and P2) may be manufactured at a lower cost because of reduced material requirements. In addition, since the alternator 2 may be made more compact than in the previously-described embodiment, it is easy to install the alternator 2 into an engine compartment which has many space limitations. Further, the alternator having the stay-reinforcement ribs 71 and 72 whose inclination angle (corresponding to the embodiment) falls within the range $0°<\theta\leq+10°$ may provide greater rigidity of the mount stays 61 and 62 than those of the previously-described embodiment. However, if the inclination angle exceeds 10°, the material cost may become high.

In the embodiment, the present invention is applied to the alternator 2 as an alternating current generator for a vehicle, however the present invention may be applied to an internal combustion engine other than an engine to be mounted on a vehicle as well as other alternating current generators driven by a driving power source such as an electric motor, a water mill wheel, a windmill wheel and the like.

An engine is used as a mounting member in this embodiment; however, another driving source such as a vehicle body or the like may be used. The first and the second supports which support the alternator 2 such as the engine-side brackets 51 and 52 may include multiple supports.

The present invention is applied to the alternator 2 which has the stator 4 sandwiched between the drive frame 21 and the rear frame 22; however, it may be applied to an alternator having a drive frame and a rear frame directly fitted to each other.

In the embodiment, the present invention is applied to both the stay-reinforcement ribs 71 and 72 of the mount stays 61 and 62; however, it may be applied to either one of the stay-reinforcement ribs 71 and 72 of the mount stays 61 and 62.

Moreover, the stay-reinforcement ribs 71 and 72 may be formed to extend from both sides of the leg members 63 and 66 of the mount stays 61 and 62 to the cylindrical portion of the frames.

According to the invention, since the rigidity of the stay-reinforcement ribs or connecting members is increased, strain is not generated in the stays or the frames as a result of vibrations transmitted from a vibrating body, so that deformation of the frames is prevented. Particularly, since strain is not generated in the cylindrical portion or in the side-wall portions which rotatably support the shaft and the rotor, deformation of the stator or the rotor is prevented. As a result, the trueness of the circle of the inner periphery of the stator does not change and the air gap between the outer periphery of the rotor and the inner periphery of the stator does not change, so that the distortion of the magnetic field does not increase.

Further, since rigidity of the reinforcement members of the stays or the connecting portions is increased, fluctuation of rotation is prevented. Still further, since rigidity of the reinforcement members of the stays or the connecting portions is increased, there is no possibility that vibration from a vibrating body is amplified by the stays and transmitted to the frames. As a result, the vibration transmitted to the stator and the rotor may be reduced and the distortion of the magnetic field does not increase.

Accordingly, an increase in the magnetic field distortion is prevented and the harsh sound generated in a low engine speed range is suppressed.

In the foregoing discussion of the present invention, the invention has been described with reference to specific embodiments thereof. It will, however, be evident that various modifications and changes may be made to the specific embodiments of the present invention without departing from the broader spirit and scope of the invention as set forth in the appended claims. Accordingly, the description of the present invention in this document is to be regarded in an illustrative, rather than a restrictive, sense.

What is claimed is:

1. An alternator adapted to be mounted on a vibrating body, said alternator comprising:

a rotor having a shaft rotatable therewith as a unit, a stator disposed around said rotor, a first frame having a first side wall rotatably supporting one end of said shaft, a first cylindrical portion supporting one side of said stator, a first stay disposed at a circumference of said first cylindrical portion and adapted to be secured to said vibrating body and a first connecting member integral with said first frame connecting said first stay to an outer surface of said first cylindrical portion, and a second frame having a second side wall rotatably supporting another end of said shaft, a second cylindrical portion supporting another side of said stator, a second stay disposed at a circumference of said second cylindrical portion and adapted to be secured to said vibrating body together with said first stay and a second connecting member integral with said second frame connecting said second stay to an outer surface of said second cylindrical portion, wherein said first connecting member diagonally extends from said first stay to said first side wall and said second connecting member extends from said second stay to said second side wall so that said first and second connecting members, said stator and said first and second frames form a triangle in an axial cross-section including said shaft to increase rigidity when said first and second stays are secured to said vibrating body.

2. An alternator according to claim 1, wherein said first connecting member comprises a first reinforcement member integral with a portion between said first side wall and said first stay, and said second connecting member comprises a second reinforcement member integral with a portion between said second side wall and said first stay.

3. An alternator according to claim 1, wherein each of said first and second stays comprises a fixture member thicker than other portions of first and second said stays.

4. An alternator according to claim 1, wherein at least one of said connecting members comprises a member having an inclination angle within −20° to +10° with respect to a line drawn between a point substantially at a center of said stays and a corresponding axial end portion of said alternator.

5. An alternator adapted to be mounted to a vibrating body, said alternator comprising:

a rotor having a shaft rotatable therewith as a unit, a stator disposed around said rotor, a frame having front and rear wall portions rotatably supporting said rotor and front and rear cylindrical portions supporting said rotor and said stator, a front stay formed at a circumference of said front cylindrical portion adapted to be secured to said vibrating body, a rear stay formed at a circumference of said rear cylindrical portion adapted to be secured to said vibrating body together with said front stay, a front connecting member connecting said front stay and said front cylindrical portion, said front connecting member having a diagonal member extending from a side of said front stay to said front wall portion, and a rear connecting member connecting said rear stay and said rear cylindrical portion, said rear connecting member having a diagonal member extending from a side of said rear stay to said rear wall portion, wherein said front and rear connecting members, said stator and said frame form a triangle in an axial cross section to increase rigidity when said front and rear stays are secured to said vibrating body.

6. An alternator according to claim 5, wherein each of said front and rear stays comprises a fixture member thicker than other portions of said front and rear stays.

7. An alternator adapted to be mounted on a vibrating body, said alternator comprising:

a rotor having a shaft rotatable therewith as a unit, a stator disposed around said rotor, a frame having front and rear wall portions for rotatably supporting said rotor and front and rear cylindrical portions for supporting said rotor and said stator, a pair of triangular stays respectively disposed along circumferences of said front and rear cylindrical portions and having fixtures for jointly mounting said alternator on said vibrating body, and a pair of reinforcement members each integrally connected between one of said triangular stays and one of said front and rear cylindrical portions, each of said reinforcement members diagonally extending from one of said stays to an outer surface of one of said wall portions so that said reinforcement members, said stator and said frame form a triangle in an axial cross section to increase rigidity when said stays are secured to said vibrating body.

8. An alternator according to claim 7, wherein each of fixture members is thicker than other portions of said triangular stays.

9. An alternator according to claim 7, wherein at least one of said reinforcement members comprises member having an inclination angle within −20° to +10° with respect to a line drawn between a point substantially at a center of said stays and a corresponding axial end portion of said alternator.

* * * * *